United States Patent [19]
Kwak

[11] Patent Number: 5,349,446
[45] Date of Patent: Sep. 20, 1994

[54] METHOD FOR DISPLAYING PRINTING SITUATION OF A COLOR VIDEO PRINTER

[75] Inventor: Hee-Guk Kwak, Suwon, Rep. of Korea

[73] Assignee: SamSung Electronics Co., Ltd., Maetan, Rep. of Korea

[21] Appl. No.: 812,945

[22] Filed: Dec. 24, 1991

[30] Foreign Application Priority Data

Jan. 18, 1991 [KR] Rep. of Korea ............... 1991-799

[51] Int. Cl.⁵ .................. H04N 1/40; H04N 1/46; G09G 5/00
[52] U.S. Cl. .................. 358/296; 358/504; 345/22; 345/140
[58] Field of Search .............. 358/296, 300, 75, 76, 358/78, 405, 434, 439, 442, 468, 504, 527, 909, 518; 355/208, 209, 326, 327; 346/157; 340/701, 722; 345/22, 23, 24, 35–40, 133, 140

[56] References Cited

U.S. PATENT DOCUMENTS 4,727,434 2/1988 Kawamura .................. 358/518
5,060,060 10/1991 Udagawa et al. .......... 358/518
5,181,105 1/1993 Udagawa et al. .......... 358/518

*Primary Examiner*—Benjamin R. Fuller
*Assistant Examiner*—Eric Frahm
*Attorney, Agent, or Firm*—Robert E. Bushnell

[57] ABSTRACT

A method for easily notifying a user of the printing status of a color video printer by displaying the printing status of the color video printer. In order to display the color being printed, a pedestal level signal and a white level signal are multiplexed in response to a pulse width converted control signal. The multiplexed signal and a chrominance signal are applied to multiplex the chrominance signal in response to a selection control signal, and a multiplexed chrominance signal is displayed on a screen of a monitor by stimulating the screen monitor with an additive mixture of color so as to display the printing status.

22 Claims, 4 Drawing Sheets

METHOD FOR DISPLAYING PRINTING SITUATION OF A COLOR VIDEO PRINTER

BACKGROUND OF THE INVENTION

The present invention relates to a color video printer, and more particularly to a method for easily notifying a user of the printing status of a color video printer by displaying the printing status of the color video printer at that time.

Generally, in a color video printer, the printing status can be seen by a user, but techniques for more easily displaying the printing status have been demanded.

FIG. 1 shows a block diagram of a conventional color video printer. If a composite video signal is applied to a Y/C separator 1 from an input terminal 1H, the Y/C separator 1 separates the video signal into a luminance signal and a chrominance signal. A first switch 2 is for selectively switching a signal generated from the Y/C separator 1 or a super video signal applied to an input terminal 2H. A decoder 3 converts a signal selected by the first switch 2 into color difference signals R-Y, B-Y and Y, and a second switch 4 selectively transmits the color difference signals R-Y, B-Y and Y to a memory 6 or a third switch 7 in response to a control signal of a switching controller 5. The third switch 7 selects an output signal of the memory 6 or the second switch 4 in response to the control signal of the switching controller 5. A decoder 8 separates the received color difference signal into chrominance signals R (Red), G (Green) and B (Blue), and a fifth switch 12 sequentially selects the chrominance signals R, G and B in the order of B, R and G depending on the printing order. Then, an A/D (Analog-to-Digital) converter 13 converts the chrominance signals B, R and G received from the fifth switch 12 into a digital signal in response to a clock pulse supplied from an external clock generator. The digitally converted chrominance signal is stored into a line memory 14 and is pulse width converted by an intermediate converter 15. Then, in a TPH (Thermal Printing Head) unit 16, the color printing is carried out in response to the pulse width converted chrominance signal. In this case, color components Y (Yellow), M (Magenta) and C (Cyan) are sequentially printed. Meanwhile, the chrominance signals R, G and B produced from the decoder 8 are again converted into a composite video signal by an encoder 9 and the composite video signal is applied to a fourth switch 10. Moreover, a pedestal level signal of a pedestal level input terminal PL is also applied to the fourth switch 10. In response to a control signal of a monostable multivibrator 11, the fourth switch 10 generates the pedestal level signal with respect to a portion being printed, and generates the composite video signal with respect to the portion that is not being printed. The signals generated by the fourth switch 10 are then displayed on a screen monitor. Therefore, on the screen monitor, the portion being printed is indicated by a black bar indicative of the pedestal level signal. Thus, since the portion being printed is displayed by a black bar and the other portion is displayed by a corresponding composite video signal, irrespective of the colors Y, M and C, the user cannot know what color is being printed.

SUMMARY OF THE INVENTION

It is therefore an object of the present invention to provide a method for easily notifying a user of the printing status of a color video printer by displaying the printing status of the color video printer at that time.

In accordance with an aspect of the present invention, a color video printer includes a Y/C separator 1 for separating a composite video signal applied to an input terminal 1H into a luminance signal and a chrominance signal, a first switch for switching a separated signal through the Y/C separator 1 and a super video signal applied to an input terminal 2H, a decoder 3 for converting a signal selected by the first switch 2 into color difference signals R-Y, B-Y and Y, a second switch 4 for switching the color difference signals R-Y, B-Y and Y in response to a control signal of a switching controller 5, a memory 6 for storing a selected signal by the second switch 4, a third switch 7 for switching between a signal selected by the second switch 4 and an output signal of the memory 6 in response to the control signal of the switching controller 5, a decoder 8 for separating a signal selected by the third switch 7 into chrominance signals R, G and B, a fifth switch 12 for selectively switching the chrominance signals R, G and B, an A/D converter 13 for digitally converting a signal selected by the fifth switch 12 in response to a clock pulse generated from an external clock generator, a line memory 14 for storing a digitally converted signal, an intermediate converter 15 for pulse width converting a signal produced from the line memory 14, a TPH unit 16 for printing a pulse width converted signal, a fourth switch 18 for switching a signal generated from the decoder 8 and an output signal of a pedestal level unit 17 in response to a control signal of a monostable multivibrator 11, and an encoder 9 for converting a signal selected by the fourth switch 18 into a composite video signal. Moreover, the fourth switch 18 has a first multiplexer 18a and a second multiplexer 18b, and the pedestal level unit 17 has a white level unit 17a and a pedestal level unit 17b. In order to display the color being printed, a pedestal level signal and a white level signal are multiplexed in response to a pulse width converted control signal. The multiplexed signal and a chrominance signal are then applied to the second multiplexer to multiplex the chrominance signal in response to a selection control signal, and a multiplexed chrominance signal is displayed on a screen of a monitor by stimulating the screen monitor with an additive mixture of color so as to display the printing status.

BRIEF DESCRIPTION OF THE DRAWINGS

The advantages and features of the present invention will become more apparent by describing in detail the preferred embodiment of the present invention with reference to the attached drawings in which.

DETAILED DESCRIPTION OF THE PREFERRED EMBODIMENT

Figure 1:
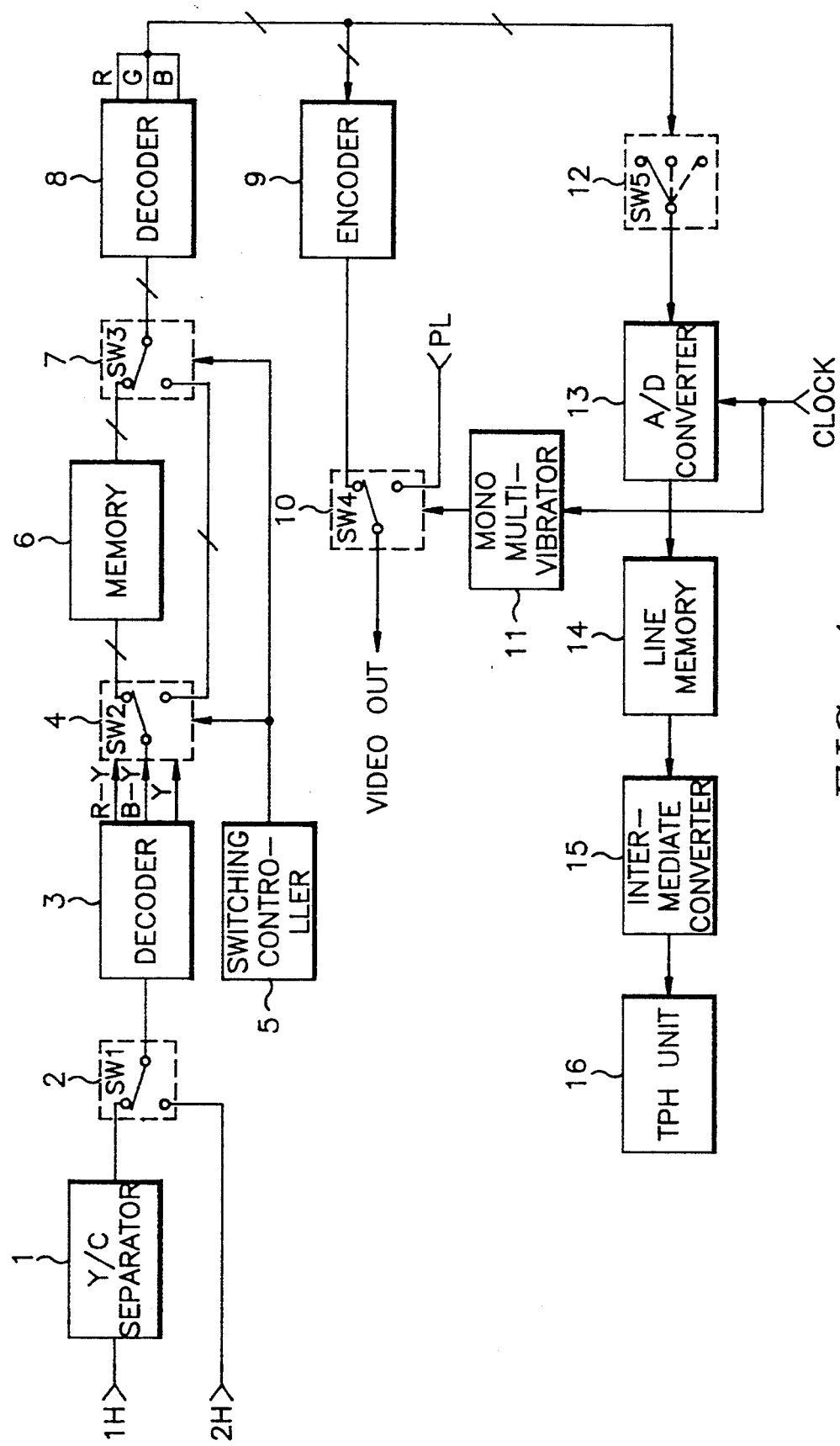
FIG. 1 is a block diagram of a conventional color video printer.
Figure 2:
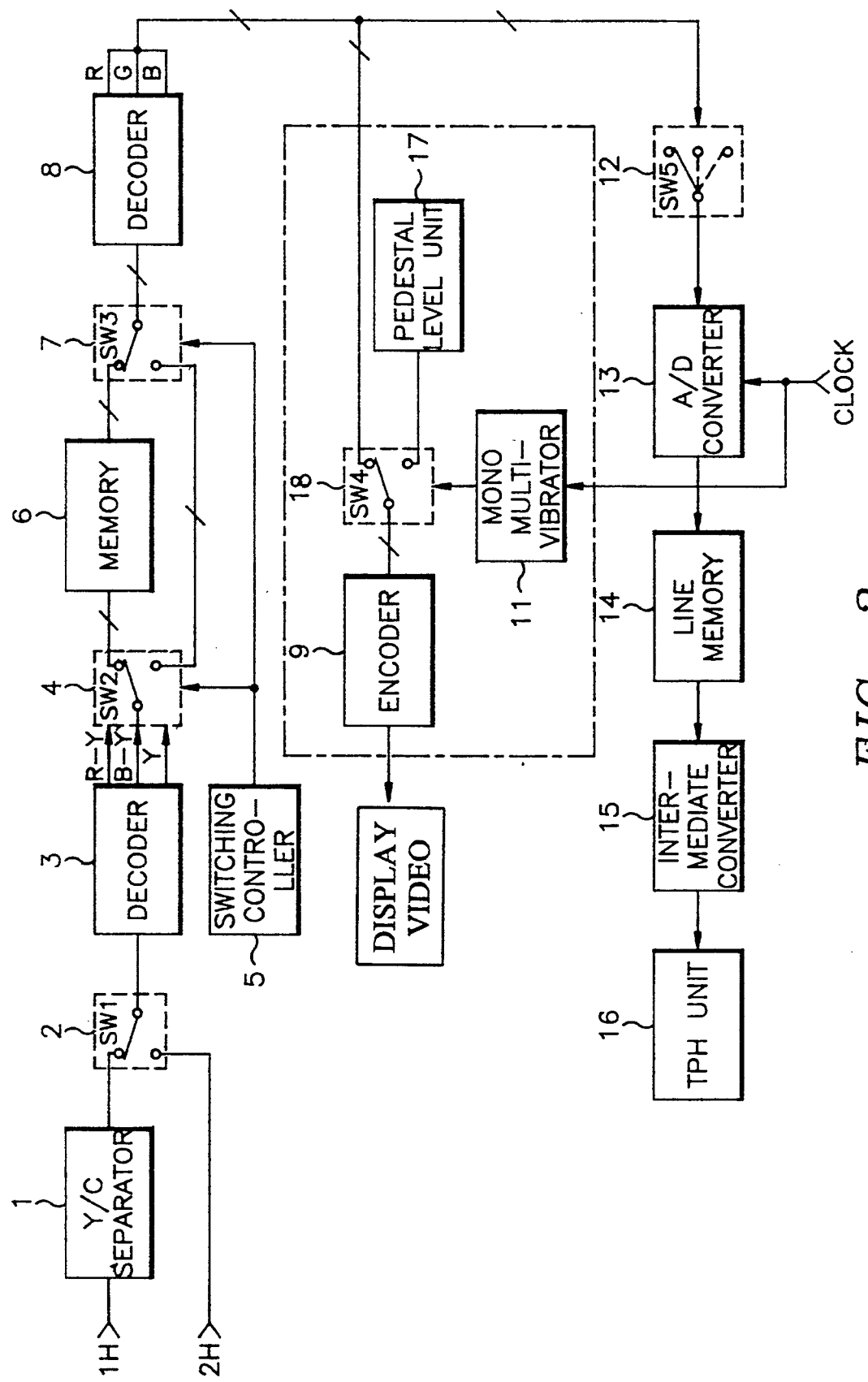
FIG. 2 is a block diagram of a color video printer of a preferred embodiment according to the present invention.

Referring to FIG. 2, it should be noted that the operation of the blocks indicated by the same reference numerals as the blocks of FIG. 1 is identical to that of FIG. 1. In order to display the color being printed in a color video printer, when the color video printer is printing yellow, a vertical bar is displayed in blue on a screen of a monitor and the screen except for the blue bar is displayed by yellow. If magenta is printed, the vertical bar is shown in green and the screen, except for the green bar, is indicated by magenta. Moreover, if cyan is printed, the vertical bar is displayed in red and the screen, except for the red bar is shown by cyan. In the following description, it is assumed that the color printed is yellow. An external clock pulse applied to the A/D converter 13 is supplied whenever a horizontal synchronizing signal is generated from the screen of the monitor. In this case, the clock is generated because a pulse is applied from the top of the left of the monitor to the bottom of the left of the monitor, and if one vertical synchronizing signal is generated, a pulse is vertically applied from the next picture element of a current picture element. That is, a clock is provided so that the vertical bar can be shifted from the left of the monitor to the right of the monitor. Since the width of the clock pulse applied to the A/D converter 13 is very narrow, the monostable multivibrator 11 enlarges the width of the clock pulse and provides a selection control signal to a fourth switch 18.

Figure 3:
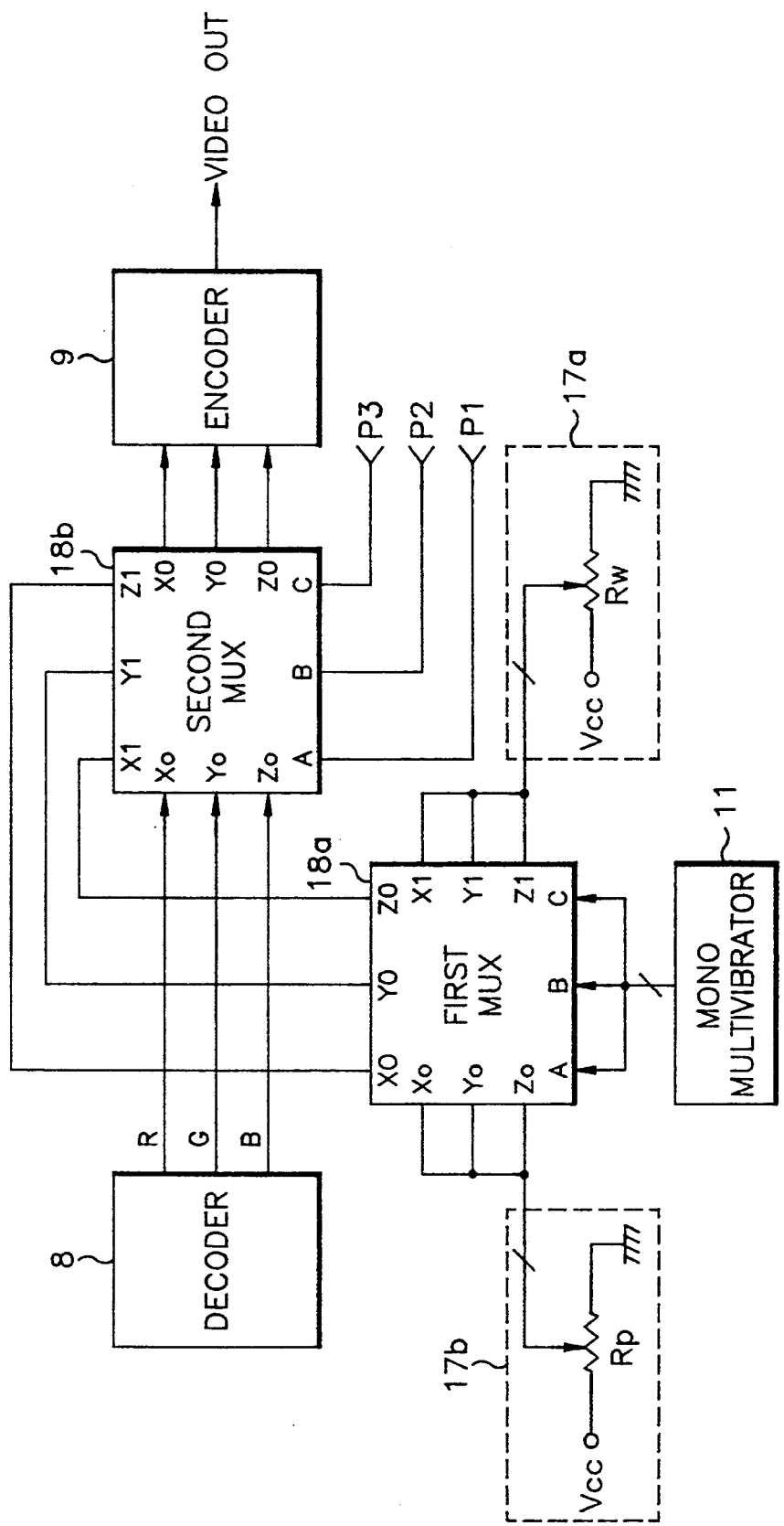
FIG. 3 is a circuit diagram of a fourth switch and a pedestal level unit of FIG. 2.

Referring to FIG. 3, the fourth switch 18 includes a first multiplexer 18a, a second multiplexer 18b and a pedestal level unit 17 which generates a white level signal from 17a and a pedestal level signal from 17b. When yellow is printed, a logic "low" signal is generated in control input terminals P1 and P2 of the second multiplexer 18b and a logic "high" signal is produced in a control input terminal P3 of the second multiplexer 18b. In this case, the output of the monostable multivibrator 11 becomes a logic "high" level and output terminals Xo, Yo and Zo of the second multiplexer 18b produce red, green and blue, respectively. Hence, the encoder 9 produces the vertical bar in blue on the screen of the monitor and the screen, except for the blue bar is displayed in yellow. The yellow is generated by an additive mixture of color such as R+G+B=W, R+B=M, R+G=Y and G+B=C. Thus, when yellow is printed, the vertical bar is displayed in blue. Further, when magenta is printed and when cyan is printed, the vertical bar is indicated in green and red, respectively. Moreover, on the part of the screen except for the vertical bar, the color being printed is displayed. In addition, the control signal applied to the control input terminals P1, P2 and P3 is generated from a microcomputer (not shown in the drawing). That is, the microcomputer produces a signal for displaying the current printing status to an output port, and as a result, when yellow is printed, the selection terminals A and B of the second multiplexer 18b become a logic "low" level and the selection terminal C becomes a logic "high" level. When magenta is printed, the selection terminals A and C become a logic "low" level and the selection terminal B becomes a logic "high" level. Similarly, when printing cyan, the selection terminals B and C become a logic "low" level and the selection terminal A becomes a logic "high" level.

Figure 4:
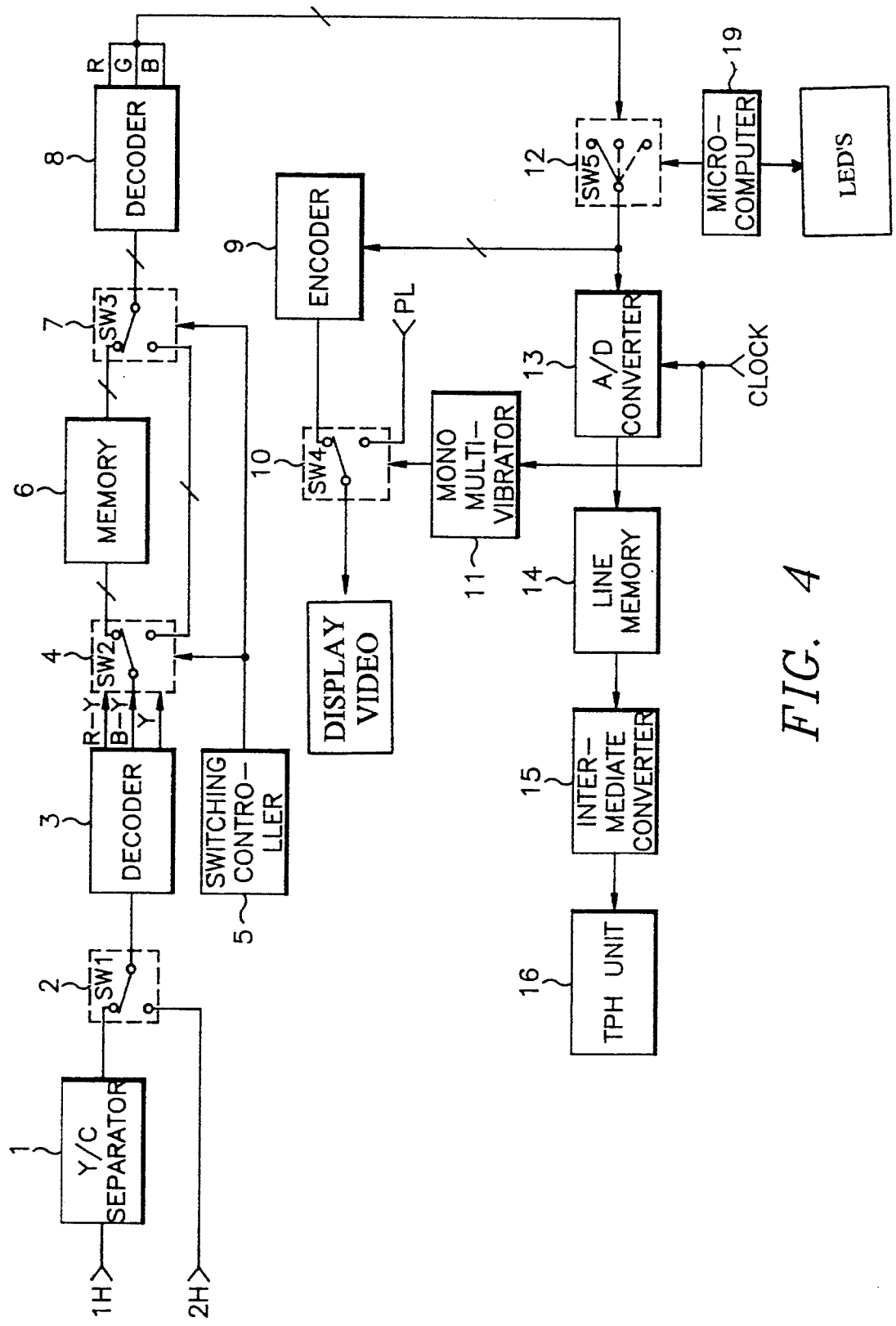
FIG. 4 is a block diagram of a color video printer of another preferred embodiment according to the present invention.

Referring to FIG. 4, a switching signal selected by the fifth switch 12 is applied to the encoder 9 and the switching select signal of the fifth switch 12 is generated in a microcomputer 19. Thus, the fifth switch 12 can sequentially select the chrominance signals B, G and R by using the microcomputer 19. Moreover, the fourth switch 10 selects either the output signal of the encoder 9 or the pedestal level signal of the pedestal level input terminal PL in response to a control signal of the monostable multivibrator 11. Hence, when yellow is printed, the microcomputer 19 selects blue and applies it to the encoder 9. Consequently, the vertical bar is displayed in black and the screen, except for the vertical bar is displayed by blue. While printing magenta, the vertical bar is indicated in black and the rest of the screen is shown by green. Moreover, when cyan is printed, the vertical bar is indicated in black and the rest of the screen is displayed in red. Hence, if red is shown on the monitor, the user will be aware that the last color is being printed. Furthermore, a LED (light emitting diode) of Y, M and C may be connected to an output port of the microcomputer 19 in order to show the printing status and the color being printed.

As described above, according to the present invention, the user can easily know the printing status by a display of colors.

While the present invention has been particularly shown and described with reference to the preferred embodiment, it will be understood by those skilled in the art that the foregoing and other changes in form and details may be made without departing from the spirit and scope of the present invention.

I claim:

1. A method for displaying a printing status of a color video printer, comprising the steps of:
    multiplexing a pedestal level signal and a white level signal in response to a pulse width converted control signal to produce a first multiplexed signal;
    receiving said first multiplexed signal and a chrominance signal, and multiplexing said chrominance signal in response to a selection control signal to produce a multiplexed chrominance signal; and
    displaying said multiplexed chrominance signal on a variable visual display by stimulating said variable visual display with colors representative of a color as printed by the video printer.

2. The method as claimed in claim 1, wherein said step of displaying said multiplexed chrominance signal is comprised of the steps of:
    displaying a vertical bar of blue and a screen of yellow when yellow is being printed by the video printer;
    displaying said vertical bar of green and said screen of magenta when magenta is being printed by the video printer; and
    displaying said vertical bar of red and said screen of cyan when cyan is being printed by the video printer.

3. The method as claimed in claim 1, wherein said step of displaying printing status is comprised of the steps of:
    displaying a screen of blue and a vertical bar of black having a given width depending on a printing status when yellow is being printed by the video printer;
    displaying a screen of green and a said vertical bar of black having said given width depending on the printing status when magenta is being printed by the video printer; and
    displaying a screen of red and said vertical bar of black having said given width depending on printing status when cyan is being printed by the video printer.

4. The method as claimed in claim 1, wherein said step of displaying the printing status is performed by illuminating light emitting diodes radiating colors of yellow, magenta and cyan.

5. A method of displaying a printing status of a color video printer controlled by chrominance signals of a composite video signal, comprising the steps of:
multiplexing a pedestal level signal with a white level signal to generate first multiplexed signals;
multiplexing said first multiplexed signals with said chrominance signals to generate second multiplexed signals;
encoding said second multiplexed signals to generate an encoded composite video signal; and
displaying said printing status on a visual display providing images varying in dependence upon said encoded composite video signal.

6. The method as claimed in claim 5, wherein said step of displaying said printing status comprises the steps of:
displaying a first color on a first portion of said visual display; and
displaying a second color on a second portion of said visual display.

7. The method as claimed in claim 5, wherein said step of displaying said printing status comprises the steps of:
displaying a first color as a vertical bar on a first portion of said visual display; and
displaying a second color on a second portion of said visual display, said second portion being a remainder of said visual display not covered by said first portion.

8. The method as claimed in claim 5, wherein said printing status is displayed by light emitting diodes.

9. A method of displaying a printing status of a color video printer controlled by chrominance signals of a composite video signal, comprising the steps of:
sequentially selecting said chrominance signals to generate a selected chrominance signal;
encoding said selected chrominance signal to generate an encoded chrominance signal; and
selectively enabling transmission of one of said encoded chrominance signal and a pedestal level signal; and
displaying said printing status on a visual display presenting variable images varying in dependence upon one of said encoded chrominance signal and said pedestal level signal.

10. The method as claimed in claim 9, wherein said step of displaying said printing status comprises the steps of:
displaying a first color on a first portion of said visual display; and
displaying a second color on a second portion of said visual display.

11. The method as claimed in claim 9, wherein said step of displaying said printing status comprises the steps of:
displaying a first color as a vertical bar on a first portion of said visual display; and
displaying a second color on a second portion of said visual display, said second portion being a remainder of said visual display not displayed as a part of said first portion.

12. An apparatus for showing a printing status of a color video printer, comprising:
decoding means for separating chrominance signals from a composite video signal;
pedestal level unit means for generating a pedestal level signal and a white level signal;
multivibrator means for pulse width modulating a clock pulse to generate a selection control signal;
switch means for switching signals comprising:
first multiplexing means for multiplexing said white level signal and said pedestal level signal in response to said selection control signal to generate first multiplexed signals; and
second multiplexing means for multiplexing said first multiplexed signals and said chrominance signals in response to control input signals from an external source to generate second multiplexed signals;
encoding means for converting said second multiplexed signals into said composite video signal; and
a visual display for displaying images varying as a function of said printing status in dependence upon said composite video signal.

13. The apparatus as claimed in claim 12, wherein a first color dependent on the printing status of the color video printer is displayed on a first portion of said visual display and a second color dependent on the printing status of the color video printer is displayed on a second portion of said visual display.

14. The apparatus as claimed in claim 12, wherein a first color dependent on the printing status of the color video printer is displayed as a vertical bar on a first portion of said visual display and a second color dependent upon the printing status of the color video printer is displayed on a second portion of said visual display, said second portion being a remainder of said visual display not included in said first portion.

15. The apparatus as claimed in claim 13, wherein said clock pulse is generated whenever a horizontal synchronous pulse is generated on said visual display.

16. An apparatus for showing a printing status of a color video printer, comprising:
decoding means for separating chrominance signals from a composite video signal;
pedestal level unit means for generating a pedestal level signal;
multivibrator means for pulse width modulating a clock pulse from a clock pulse generator, said multivibrator means generating a selection control signal;
first switch means for providing selected chrominance signals by sequentially selecting said chrominance signals separated from said composite video signal in response to a control signal from a microcomputer;
encoding means for converting said selected chrominance signals into said composite video signal;
second switch means for enabling transmission of one of said composite video signal and said pedestal level signal in response to said selection control signal; and
a visual display for displaying said printing status in dependence upon one of said composite video signal and said pedestal level signal.

17. The apparatus as claimed in claim 16, wherein a first color dependent on the printing status of the color video printer is displayed on a first portion of said visual display and a second color dependent on the printing status of the color video printer is displayed on a second portion of said visual display.

18. The apparatus as claimed in claim 16, wherein a first color dependent on the printing status of the color video printer is displayed as a vertical bar on a first portion of said visual display and a second color dependent upon the printing status of the color video printer is displayed on a second portion of said visual display, said second portion being a remainder of said visual display not covered by said first portion.

19. An apparatus for showing a printing status of a color video printer, comprising:

- decoding means having a plurality of outputs for separating chrominance signals from a composite video signal;
- first switching means for selectively switching the chrominance signals;
- analog-to-digital converting means for digitally converting a signal selected by said first switching means in response to a clock pulse;
- multivibrator means for pulse width modulating the clock pulse to generate a selection control signal;
- pedestal level unit means for generating a pedestal level signal and a white level signal;
- microcomputing means for generating control input signals;
- second switching means for providing an output by selectively switching between said plurality of outputs of said decoding means and said pedestal level unit means in response to the selection control signal and the control input signals;
- encoder means for converting said output of said second switching means into the composite video signal; and
- a visual display for displaying images indicative of said printing status varying in dependence upon the composite video signal.

20. The apparatus as claimed in claim 19, wherein said second switching means comprises:

- first multiplexing means for multiplexing the pedestal level signal and the white level signal in response to the selection control signal to generate multiplexed signals; and
- second multiplexing means for multiplexing the multiplexed signals and the chrominance signals in response to the control input signals to generate the output of said second switching means.

21. The apparatus as claimed in claim 20, wherein a first color dependent on the printing status of the color video printer is displayed on a first portion of said visual display and a second color dependent on the printing status of the color video is displayed on a second portion of said visual display.

22. The apparatus as claimed in claim 20, wherein a first color dependent on the printing status of the color video printer is displayed as a vertical bar on a first portion of said visual display and a second color dependent upon the printing status of the color video printer is displayed on a second portion of said visual display, said second portion being a remainder of said visual display not included within said first portion.

* * * * *

UNITED STATES PATENT AND TRADEMARK OFFICE
CERTIFICATE OF CORRECTION

PATENT NO. : 5,349,446

DATED : 20 September 1994

INVENTOR(S) : Hee-Guk Kwak

It is certified that error appears in the above-indentified patent and that said Letters Patent is hereby corrected as shown below:

On the title page:

In Item No. [54], change "situation" to --status--.

Claim 3, column 4, line 59, delete "a."

Signed and Sealed this

Eighteenth Day of April, 1995

*Attest:*

BRUCE LEHMAN

*Attesting Officer*   *Commissioner of Patents and Trademarks*